United States Patent

Kuehnle et al.

[15] 3,705,294

[45] Dec. 5, 1972

[54] DATA CARD AND METHOD OF ENCODING SAME

[72] Inventors: Manfred R. Kuehnle, Lexington; Jurgen Kok, Bedford; Dieter Jochimsen, Winchester, all of Mass.

[73] Assignee: Elliott Business Machines, Inc., Randolph, Mass.

[22] Filed: April 8, 1970

[21] Appl. No.: 26,514

[52] U.S. Cl. ............................................235/61.12 N

[51] Int. Cl. ............................................G06k 19/06

[58] Field of Search..235/61.11 E, 61.12 R, 61.12 C, 235/61.12 M, 61.12 N, 61.7 B; 340/149 A; 35/48; 117/36.7

[56] References Cited

UNITED STATES PATENTS

| | | | |
|---|---|---|---|
| 2,735,617 | 2/1956 | Knutsen | 235/61.12 N |
| 2,525,837 | 10/1950 | Simplair | 235/61.12 C |

*Primary Examiner*—Daryl W. Cook

*Attorney*—Authur Jacob and Cyrus D. Samuelson

[57] ABSTRACT

A data card which can be encoded by the user without special encoding facilities has a substrate with a first light reflection characteristic. The substrate carries a code field embracing all possible "bit" locations in the code. Selected bit areas in the field are treated to give them a different light reflection characteristic from the substrate in the remainder of the field, thereby impressing a code pattern in the code field consisting of "bit" locations having one of two different light reflection characteristics.

11 Claims, 6 Drawing Figures

INVENTORS
MANFRED R. KUEHNLE
JURGEN KOK
DIETER JOCHIMSEN
BY
Cesari and McKenna
ATTORNEYS

INVENTORS
MANFRED R. KUEHNLE
JURGEN KOK
DIETER JOCHIMSEN

BY Cesari and McKenna

ATTORNEYS

DATA CARD AND METHOD OF ENCODING SAME

BACKGROUND OF THE INVENTION

This invention relates to an improved data card and method of encoding same. It relates more particularly to a data card which is relatively inexpensive to make and which can be encoded easily by the user following simple written instructions accompanying the card.

a. Field of the Invention

The data cards with which we are concerned here are used in applications where the problems of card tampering and counterfeiting are not of prime concern. For example, the subject cards may carry a coded telephone number and be used in an automatic telephone dialer. They may also be used in inventory control systems. In this application, each card carries a part number and when a part is removed from inventory, the card is inserted into a card reading terminal connected to a data processing system which then registers the removal of the part for accounting and reorder purposes. Cards of this type also have application in the collection of data on a factory floor for process control purposes. In this case, the card carrying a coded project number is delivered along with certain parts to a work station. When the parts have been assembled, a worker inserts the card in a computer reading terminal, thus "informing" the computer that that particular step in the process has been completed.

b. The Prior Art

For the most part, the data cards that are in use today are encoded by the card manufacturer at the time that they are made. This is because the encoding equipment is fairly complex and expensive. Consequently, the customer is reluctant to set up and maintain his own card encoding facility. This is especially true in the case of the optically encoded data card which is of primary interest here.

It has been proposed to manufacture data cards so that the customer himself can encode them using relatively simple equipment at hand. This would reduce the overall cost of the cards and also enable the customer to immediately meet his demands. However, many of the proposed data cards which can be encoded in this fashion have drawbacks which militate against their wider use and commercial acceptance.

More particularly, one prior card type of which we are aware has a code field composed of an array of "-bit" areas. The entire code field is covered with a coating. To encode the card, the coating is removed from selected ones of the "bit" areas following a conventional binary code format. This renders those "bit" areas electrically or optically different from the remainder of the "bit" areas which are still coated. For example, an uncoated area may represent a binary ONE, while a coated areas represents a binary ZERO. The code pattern can then be read by a suitable reader which is able to sense the uncoated bit areas.

Prior cards of this type generally perform satisfactorily when they are new. However, with continued handling, coated areas in the code field tend to become scratched or to pull away from the card substrate. This makes it difficult for the reader to properly decode the information on the card so that there is a greater incidence of error in the data fed to the processing system.

Other errors arise due to faulty encoding of the card. That is, sometimes the person removing the coating material from one "bit" area inadvertently removes some material from an adjacent "bit" area. As a result, the card reader may "see" the latter "bit" as uncoated, i.e. as a binary ONE, when it should see a binary ZERO. The same sort of error arises when the card is encoded by coating selected "bit" areas in a code field to change their optical or electrical characteristics. As a practical matter, then, it has been a tedious, time-consuming task to properly encode prior cards of this type and the cards themselves have not been entirely satisfactory in use.

SUMMARY OF THE INVENTION

Accordingly, it is an object of the present invention to provide an improved data card which can be encoded by the user himself.

Another object of the invention is to provide a data card of the type which can be encoded by the user himself which does not require any complex equipment to impress the code on the card.

Still another object of the invention is to provide a data card which helps to minimize errors in the encoding process.

Yet another object of the invention is to provide a data card whose code pattern is relatively immune to inadvertent alterations and changes in the code pattern due to continued handling and use of the cards.

A further object of the invention is to provide an improved method for encoding a data card having one or more of the above characteristics.

Other objects will in part be obvious and will in part appear hereinafter.

The invention accordingly comprises the several steps and the relation of one or more of such steps with respect to each of the others, and the construction embodying the structural features, combinations of elements and arrangement of parts which are adapted to effect such steps, all as exemplified in the following detailed disclosure, and the scope of the invention will be indicated in the claims.

Briefly, the cards with which we are concerned here are used with automatic dialers and automatic processing and inventory control systems. A card is inserted into a reading terminal which reads a code on the card and transmits the code to a central processor which initiates certain operations depending upon the information on the card and the particular application.

While the invention also has application in connection with magnetic data cards, the card type primarily of interest is designed to be used in an optical type of card reader. Each card contains a code field containing a pattern of light and dark blocks or areas arranged in a binary code. When the card is inserted into the reader, the reader discriminates between the light and dark blocks in the code field and converts the optically coded information on the card into a corresponding set of electrical signals. These signals are then used to automatically dial a particular telephone number or they are transmitted via telephone lines to a data processing system which then responds appropriately to the information on the card.

The cards themselves are made of a flexible, impact-resistant material. In one card embodiment, the code field is composed of a grid of depressions stamped into the card substrate which reflect the exact geometry of the optical code pattern. Except for the bottoms of the depressions, the entire area of the code field is treated at the time of manufacture so that it has a selected light reflection characteristic. The bottoms of the depressions, on the other hand, are treated so that they have a different light reflection characteristic. For example, using a white card substrate, the code field can be colored black except for the bottoms of the depressions which remain white. Then, small, individual strips of tape having the same color as the code field, i.e. black, may be adhered in each depression so that with all the strips in place, the entire code field is essentially the same color, i.e. black, and thus has a uniform light reflection charactistic. The important thing to note is that the cards are all substantially identical when the leave the card manufacturer.

In order to encode the card, one simply removes the tape strips from selected ones of the depressions in the code field with a pencil or other pointed instrument following simple encoding instructions. Removal of the tape strips in this fashion exposes the white bottoms of the depressions and thus creates a coded pattern of white and black blocks in the code field which can be read by an optical card reader. No special tools, aside from the coding instructions, are required to encode the card. Also, since the tape strips are all separate and are recessed into the card, they do not tend to be stripped away inadvertently as the card is being encoded or handled.

In another card embodiment, a rectangular grid is inscribed in the code field. Each block in the grid corresponds to one "bit" and all blocks are of the same color, e.g. white if the card has a white substrate. The card is encoded by coloring in selected blocks in the grid following encoding instructions issued to the customer using an opaque, i.e. black, acid type of ink. The ink etches into the card surface in the selected blocks, changing their light reflection characteristic. Thus, a permanent code pattern composed of white and black blocks is impressed on the card which can be "read" by the card reader. Here, again, then, the user can encode his own card following simple instructions and without requiring elaborate special encoding equipment. Also, the code pattern is not likely to be changed due to rough handling of the card because the ink actually etches into the card.

A third card embodiment also has a substrate of a particular color, e.g. white. However, the entire code field in this card is coated with a material having a different light reflection characteristic. For example, a black paint may be silk-screened onto the code field. To encode this card, the user scuffs or scratches the coating material from selected blocks in the code field with a stylus following the encoding instructions, so that a code pattern composed of white and black blocks is impressed on the card. This pattern can be read by an optical reader in the same manner described above.

A templet should be used to facilitate encoding this card properly. The templet has a rectangular array of cutouts or openings corresponding to all possible "bit" locations or areas in the code field. The templet is engaged over the card so that the array of cutouts is in register with the code field on the card. The user can now manipulate the stylus within the various openings in the template and accurately scuff away the coating from the selected blocks in the code field. This card encoding technique, like the others, can be practiced without any elaborate encoding facilities. The mask or templet, if it is used, is easily fabricated of sheet metal or plastic.

In other card embodiments, the "bit" locations can be heat or pressure sensitive as will be described later. The code pattern is applied by heating or pressing selected "bit" locations. Thus, all card embodiments can be encoded by the user with a correct, permanent code pattern. This is of particular importance in connection with the on site encoding of telephone dial cards and other types of data cards subjected to rough usage. Still, however, since the cards are made uniformly and can be encoded by the users themselves, they are relatively inexpensive to use.

BRIEF DESCRIPTION OF THE DRAWINGS

For a further understanding of the nature and objects of the invention, reference should be had to the following detailed description taken in connection with the accompanying drawings, in which.

DESCRIPTION OF THE PREFERRED EMBODIMENTS

Figure 1:
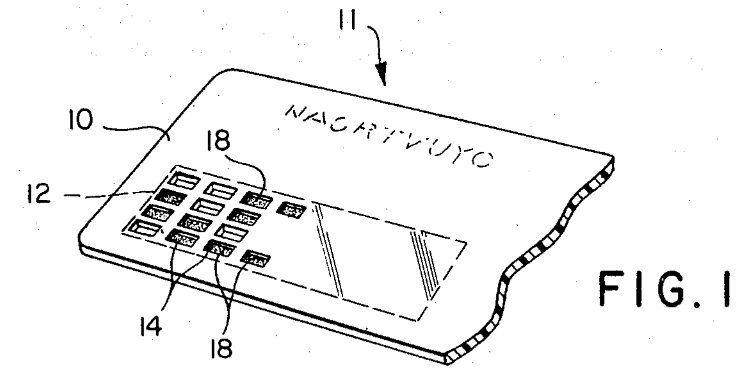
FIG. 1 is a fragmentary isometric view of a data card embodying the principles of this invention.

Turning now to FIG. 1 of the drawings, our data card indicated at 10 is generally rectangular and is fabricated of a conventional flexible, impact-resistant material such as a milk-white polyvinyl plastic. Card 10 may carry the usual printed instructions and the like indicated at 11.

Figure 1A:
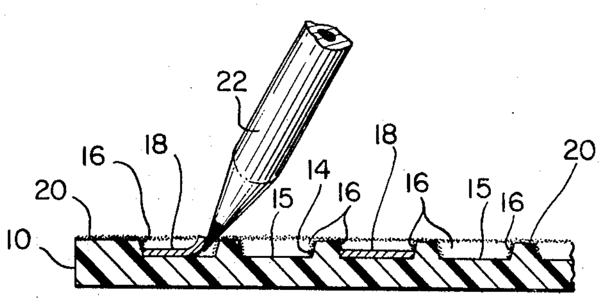
FIG. 1A is a sectional view of the FIG. 1 card showing in greater detail the technique for encoding the card.

A generally rectangular code field 12 as indicated in dotted lines occupies a portion of the card, usually near a corner thereof. Field 12 is composed of a generally rectangular array of depressions 14. These depressions 14 are stamped into card 10 at the time it is made. As best seen in FIG. 1A, each depression 14 has a generally flat bottom wall 15 and upstanding side walls 16.

Still referring to FIGS. 1 and 1A, a separate strip 18 of adhesive tape is automatically inserted into and adhered to the bottom wall 15 of each depression 14 so as to completely cover wall 15. Tape 18 is colored to contrast with the color of the card 10 substrate. Thus, in the present example involving a white card 10, tape 18 is desirably black.

After strips 18 have been inserted into all the depressions 14, an opaque coating 20 is applied to the remaining exposed areas of the code field. Coating 20 is preferably colored to match the tape strips 18, i.e. it is black. Desirably, also, opaque coating 20 is applied in accordance with the tech-niques disclosed in our copending application Ser. No. 797,045, filed Feb. 6, 1969, entitled CREDIT CARD SYSTEM. That is, a diazo dye is coated onto the card 10 at least over the code field 12 portion thereof. The dye is actually imbibed into the card surface. Then the coated areas are exposed to actinic light and developed and fixed with ammonia gas. Thereupon, the areas exposed to the light, i.e. the portions of the code field 12 not covered by strips 18, turn black while the unexposed areas, i.e. the depression bottom walls 15 underneath tape strips 18 remain white. Thus, with all the black tape strips 18 still in place, the entire code field 12 is generally black in color when the card is sent to the ultimate user.

In order to encode the card, the user simply removes the tape strips 18 from selected ones of the depressions 14 following simple written instructions (not shown) supplied with the cards. As shown in FIG. 1A, the tape 18 can be lifted up and stripped away using a pencil 22 or other comparable pointed instrument which is handy.

After the proper tape strips 18 have been removed in accordance with the instructions, card 10 and specifically its code field 12 contains a coded pattern consisting of white and black blocks, i.e. depressions 14, representing ONE and ZERO "bits" of a binary code. Once the card is encoded in this fashion, it can be inserted into an optical card reader which scans the code field 12 and develops an electrical analog of the optically coded information on the card. The signals from the card reader can then be used to dial a telephone number, or instruct a computer, or perform other machine functions for which the card is intended. A card reader capable of reading these cards is shown in our aforesaid patent application, Ser. No. 797,045.

Thus, the FIG. 1 card can be encoded very quickly by the user without any special equipment except the encoding instructions. Furthermore, the coded pattern is very distinct in that there are definite sharp boundaries 16 between white and black blocks in the code pattern. Consequently, the chance of error in the output of the card reader is minimized.

It is also important to note that there is relatively small likelihood of the code pattern on the card being changed due to handling and use of the card. This is because the tape strips 18 in depressions 14 are all recessed into the card so that it is difficult to inadvertently strip them away.

Instead of inserting tape strips 18 into depressions 14 prior to applying coating 20 as described above, it is also possible to apply a light sensitive diazo compound to the entire area of code field 12 including the depression bottom walls 15. In this event, the bottom walls 15 are masked during the exposing step. Then when the field is developed, the exposed portions of the field are black while the unexposed portions, i.e. bottom walls 15, are white. Following this, the tape strips 18 are inserted as described above. This card is encoded in the same manner as described above and produces the same distinct, definite binary code pattern in code field 12.

Figure 2:
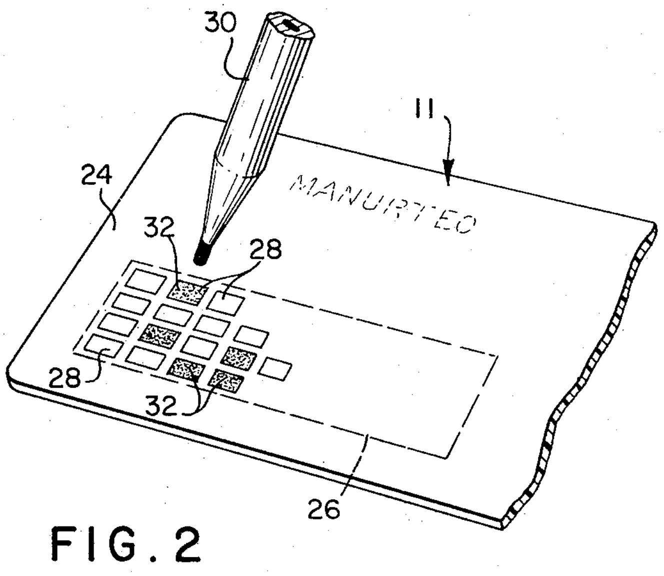
FIG. 2 is a view similar to FIG. 1 of another data card embodiment and its mode of encoding.

FIG. 2 shows another embodiment of our data card which is also relatively easy to make and can be encoded by the user himself without any special tools. The card 24 is made of the same substrate material as the card 10 in FIG. 1, i.e. white polyvinyl. Card 24 also has a code field indicated in dotted lines at 26 which contains a rectangular array of rectangles 28. These rectangles are printed onto the card when it is made and represent all possible "bit" areas in the code field.

In order to encode card 24, the user blacks out selected rectangles 28 following written encoding instructions supplied with the card. The user employs a wick-type pen 30 containing an opaque, acid type of ink. A suitable pen for this purpose is manufactured by the Carter's Ink Co. under its registered trademark "-MARKS-A-LOT". The pen applies a black, acid ink coating 32 to the area within each selected rectangle 28. This coating etches into the card substrate, producing a permanent, opaque, dark overlay in those selected bit areas. The black coated area contrasts sharply with the white uncoated rectangles 28 forming a sharp, distinct binary code pattern in field 26 which is easily read by an appropriate optical card reader such as the one noted above.

Thus, the FIG. 2 card embodiment has the same advan-tages noted above in connection with the FIG. 1 card in that it is easily encoded by the user himself and, once encoded, the coded pattern is relatively unsusceptible to change due to handling of the card.

Figure 3:
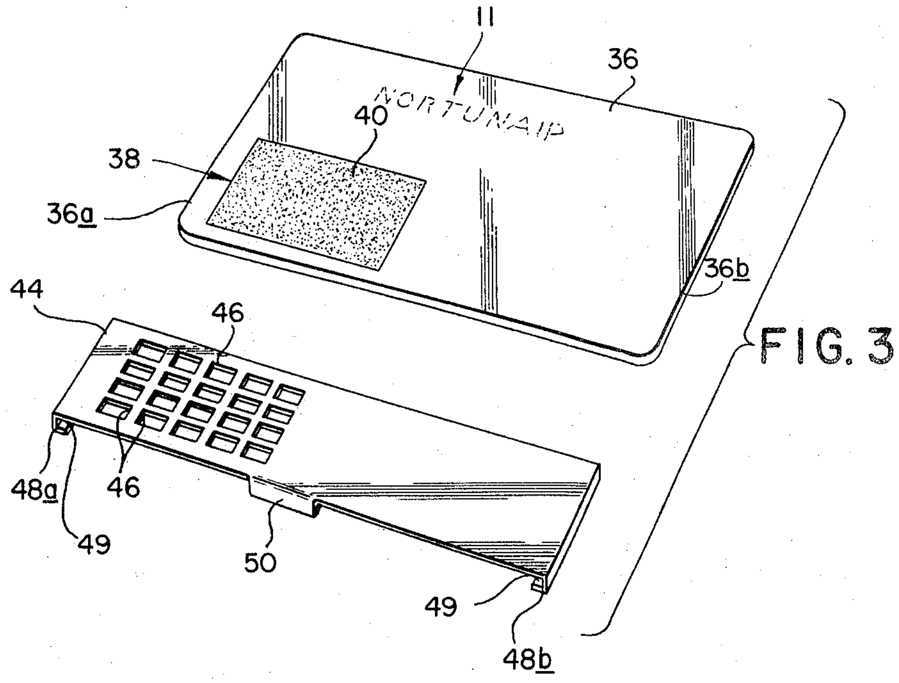
FIG. 3 is an exploded isometric view of a third data card embodiment and apparatus for encoding it.
Figure 3A:
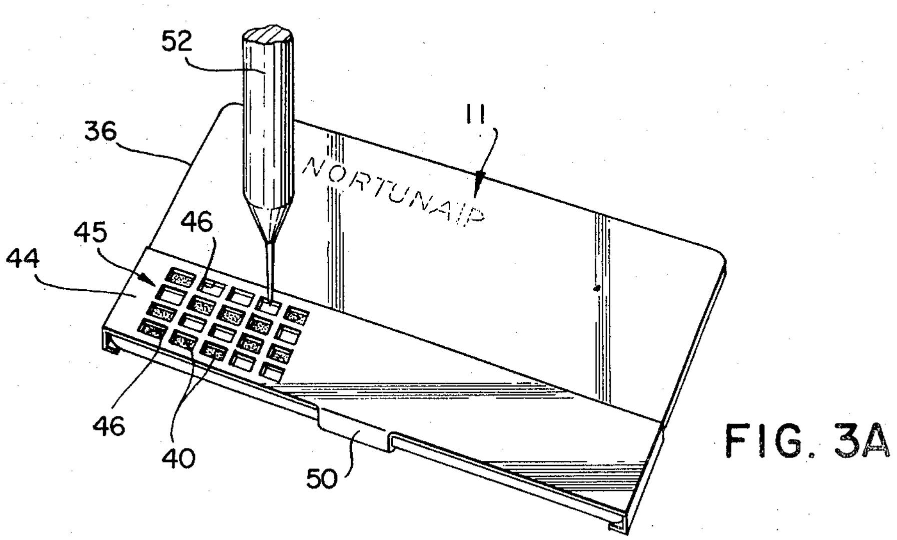
FIG. 3A illustrates the FIG. 3 card in the process of being encoded.

FIGS. 3 and 3A show still another embodiment of our data card. This card 36 is also white and has a code field 38. A black, opaque coating 40 covers the entire code field 38. For example, coating 40 may be formed by spraying black paint onto the card using a silk screen process.

A template 44 is used to encode card 36 accurately. Template 44 contains a rectangular array 45 of rectangular cutouts or openings 46. The dimensions of array 45 correspond to those of code field 38 on card 36. Further, the rectangular openings 46 correspond to all possible "bit" locations in the code field 38.

Template 44 is slightly longer than card 36. Also, its opposite end margins **48*a* and 48*b* are turned under and back on themselves to form a pair of tracks 49 which are shaped to receive the end margins 36*a* and 36*b* of card 36. An L-shaped tab 50 extends down from template 44 at the front edge thereof to act as a stop when the mask is slid onto card 36** as seen in FIG. 3A.

When template 44 is in place on the card as shown in FIG. 3A, the block array 45 in the template is in register with the code field 38 on the card. Now the user can encode the card by inserting the point of a stylus 52 through selected openings 46 in template 44 following the master encoding instructions, and scratch away the opaque coating 40 from the areas of the code field defined by those selected openings 46. Thus, in FIG. 3A, we have shown the coating 40 removed from card areas within selected openings 46 revealing the underlying white card material.

After the template 44 is removed, the code pattern applied to card 36 looks much like the one shown in FIG. 2. That is, the code pattern is composed of black and white rectangular blocks arranged in a binary code. This code is easily read using an optical card reader such as the one referred to above.

Accurate encoding of the FIGS. 3 and 3A embodiment of the data card does demand template 46. However, the same tem-plate can be used to encode all credit cards of this type, since it contains cutouts 46 corresponding to all possible "bit" locations on card 36. Actually, the same sort of template can be used to facilitate accurately blacking out the appropriate rectangles 28 when encoding the FIG. 2 card. Moreover, the template is easily and inexpensively fabricated of sheet metal or plastic using conventional etching and forming techniques. Therefore, it does not add appreciably to the overall cost of the card system.

Figure 4:
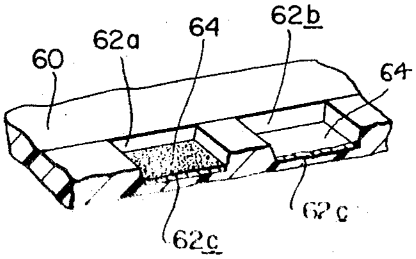
FIG. 4 is a fragmentary isometric view of still another card embodiment.

FIG. 4 illustrates a card 60 whose configuration is similar to the FIG. 1 card. That is, the card substrate is white and an array of depressions 62 including depressions **62*a* and 62*b* make up its code field. Here, however, the bottom wall 62*c* of each depression carries a coating 64** in the form of an opaque film which is adapted to be rendered locally transparent by the application of physical pressure or heat on the face of the film.

Initially, the coating 64 in each depression is of a color which contrasts with the underlying white card substrate. Then, when heat or pressure is applied to the coating in a particular depression, the film becomes transparent revealing the underlying white card substrate. Thus, it is readily apparent that the FIG. 4 card can be encoded simply by the user applying heat or pressure to selected depressions in the code field following the encoding instructions described above. As seen in FIG. 4, these depressions, e.g. depressions **62*b*, become white and contrast with the remaining undisturbed, e.g. depressions 62*a***, depressions.

Suitable coatings for this purpose are detailed in U.S. Pat. No. 3,031,328. Other suitable pressure sensitive coatings may be applied using conventional microencapsulation techniques followed by Barrett K. Green and others at National Cash Register Co. in making pressure sensitive paper and sheets.

One can also envision other obvious extensions of this concept. Thus, coating 64 may be any one of a number of conventional indicator type compounds which normally are transparent or have one color, then when exposed to a particular stimulus, chemical, pressure or heat, change to another color.

It will be appreciated from the foregoing that data cards made in accordance with the foregoing techniques enable smaller companies and organizations to incorporate data cards into their business operations at relatively modest cost and without having to purchase and maintain expensive card coding equipment. The code impressed on the cards remains definite and distinct so that it can be read accurately by a card reader, even after the card has been in use for a relatively long time.

It will thus be seen that the objects set forth above, among those made apparent from the preceding description, are efficiently attained and, since certain changes may be made in carrying out the above method and in the articles set forth above without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

We claim:

1. A data card comprising

A. a flexible, impact-resistant substrate,

B. a code field in a surface of the substrate,

C. an array of depressions in the code field, the bottom walls of the depressions having a selected light reflection characteristic, and D. a separate strip removably secured to the bottom wall of each depression, said strip

1. having a different light reflection characteristic, and

2. being individually strippable from selected depressions following encoding instructions to impress an optical code pattern in the code field.

2. A data card as defined in claim 1 wherein the strips are separate small sections of opaque adhesive tape.

3. A data card comprising

A. an impact-resistant substrate having a first selected light reflection characteristic, B. an array of depressions in a surface of the substrate, C. a coating having a different light reflection characteristic covering the entire area occupied by the array of depressions except for the bottoms of the depressions, and D. individual tape strips

1. adhered to and covering the bottoms of the depressions,

2. having a light reflection characteristic different from said first characteristic, and

3. being individually removable so that the strips in selected depressions can be stripped away in accordance with encoding instructions to expose the bottom walls thereof having the first light reflection characteristic so as to impress an optical code pattern on the card substrate.

4. A method of making a data card comprising the steps of

A. forming an impact-resistant card substrate

1. having a first light reflection characteristic, and

2. forming an array of depressions in a surface area of the card,

B. forming tape strips having essentially the same size and shape as the depressions and having a different light reflection characteristic, and C. removably inserting a separate tape strip into each depression so as to cover its bottom wall.

5. The method of making a data card as defined in claim 4 and including the additional step of applying a coating having said different light reflection characteristics to the card surface encompassed by the array except for the bottoms of the depressions so that the entire card surface encompassed by the array has substantially the same light reflection characteristic.

6. The method of making a data card as defined in claim 4 and including the additional step of removing the tape strips from selected ones of the depressions in accordance with written instructions so as to create a code pattern on the card surface consisting of the depressions containing no tape strips and having the first light reflection characteristic and the depressions containing tape strips and having the second light reflection characteristic.

7. A data card comprising

A. an impact-resistant substrate having a first light reflection characteristic, B. indicia marking an array of bit locations on a surface of the card, and C. an etch-type coating having a second selected light reflection characteristic covering selected ones of the bit locations so as to create a code pattern on the card substrate consisting of bit locations having two different light reflection characteristics.

8. A data card as defined in claim 7 wherein the coating is a black acid ink which etches into the surface of the card substrate, forming a relatively permanent coloring thereon.

9. A method of making a data card comprising the steps of

A. forming an impact-resistant card substrate having a first light reflection characteristic, B. printing indicia on the card for outlining an array of bit locations, and C. coloring in selected ones of the bit location outlines with an acid type ink having a second light reflection characteristic so as to create a relatively permanent etched code pattern composed of bit locations having a first or second light reflection characteristic.

10. A method of encoding a data card having an impact-resistant substrate including a first light reflection characteristic, said method comprising the steps of:

applying to a surface portion of the card substrate a coating having a second light reflection characteristic;

engaging an encoding means with the card substrate, said encoding means having an array of openings therein in register with the coated surface portion of the card when the encoding means is engaged on the card; and scraping away from the card surface the coating exposed through selected ones of the openings in the encoding means in accordance with written instructions so as to form a code pattern composed of areas having one of two different light reflection characteristics.

11. A data card comprising:

an impact-resistant substrate;

means defining an array of bit locations on a surface of the substrate; and a coating covering all of the bit locations, said coating normally having a first light reflection characteristic and assuming a second light reflection characteristic when subjected to an external pressure so that a code pattern consisting of bit locations having one of two different reflection characteristics may be impressed on the card.

* * * * *